United States Patent

Carpenter

[15] 3,687,238
[45] Aug. 29, 1972

[54] LOCKING WHEEL CHOCKS FOR VEHICLES

[72] Inventor: Walter C. Carpenter, 14900 E. 40 St., Independence, Mo. 64055

[22] Filed: Oct. 8, 1970

[21] Appl. No.: 79,014

[52] U.S. Cl. ..................................................188/32
[51] Int. Cl. ..................................................B60t 3/00
[58] Field of Search..................................188/32, 36

[56] References Cited

UNITED STATES PATENTS

| | | | |
|---|---|---|---|
| 1,174,410 | 3/1916 | Hajasok et al. | 188/32 |
| 2,461,248 | 2/1949 | Wright | 188/32 |
| 2,858,906 | 11/1958 | Minick | 188/32 |
| 2,998,102 | 8/1961 | Deverich | 188/32 |
| 3,537,548 | 11/1970 | Jeppesen | 188/32 |

*Primary Examiner*—Duane A. Reger
*Attorney*—John A. Hamilton

[57] ABSTRACT

Locking wheel chocks for an automotive vehicle wheel consisting of a pair of wedges adapted to be disposed respectively for and aft of said wheel, in engagement with the ground surface and confronting the periphery of the wheel, a connector joining said wedges and adapted to extend alongside said wheel, a mechanism for shortening said connector whereby said wedges are driven tightly between said wheel periphery and said road surface, and a key-operated locking device for securing said connector releasably at any desired degree of extension, and for securing said chock device to said wheel.

4 Claims, 4 Drawing Figures

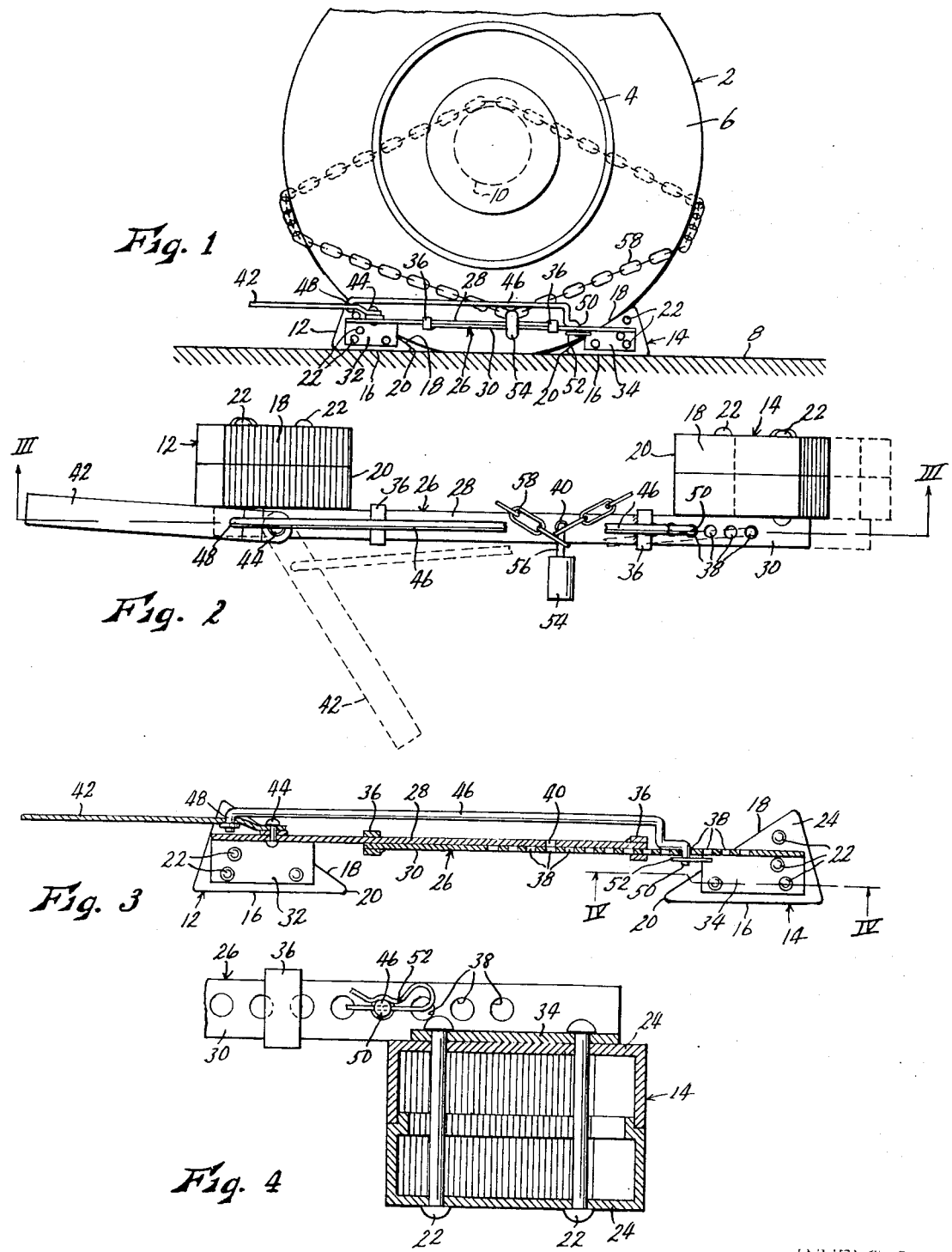

LOCKING WHEEL CHOCKS FOR VEHICLES

This invention relates to new and useful improvements in wheel chocks for automotive vehicles, and has as its object the provision of wheel chocks which secure the vehicle against rolling movement either forwardly or rearwardly in a very efficient manner, which are readily adjustable for use in connection with wheels of different sizes, which automatically accommodate to road surfaces which are rough or uneven, which are rapidly and conveniently applied and removed as desired, and which have locking means which in substantial measure both prevent theft of the chocks and of the vehicle itself.

Other objects are simplicity and economy of construction, and efficiency and dependability of operation.

With these objects in view as well as other objects which will appear in the course of the specification, reference will be had to the accompanying drawing, wherein:

FIG. 1 is a fragmentary side elevational view of a wheel of an automotive vehicle, with chocks embodying the present invention applied operatively thereto, FIG. 2 is an enlarged top plan view of the chock device only, with parts broken away, showing the chock wedges drawn toward each other and locked in solid lines, and showing the wedges moved farther apart in dotted lines, FIG. 3 is a sectional view taken on line III—III of FIG. 2, with the padlock and chain omitted, and FIG. 4 is an enlarged, fragmentary sectional view taken on line IV—IV of FIG. 3.

Like reference numerals apply to similar parts throughout the several views, and the numeral 2 applies generally to a wheel of an automotive vehicle or trailer, said wheel having the usual hub 4 and tire 6 having rolling engagement with road surface 8. The axle, or axle housing, supporting the wheel is indicated at 10 in FIG. 1.

It is often important, for safety reasons, that one or more wheels of a vehicle be securely chocked, for example while the tires of other wheels are being changed, or for other repairs, or when parking the vehicle on steep slopes in such circumstances that brakes cannot be depended on to hold the vehicle against rolling. Especially if the vehicle is a trailer, it often must be parked detached from its towing vehicle, which often powers the hydraulic brakes of the trailer, so that said brakes are inoperative. Also, such trailers must sometimes be parked and left unattended, so that it would be highly desirable if chocks could be provided which would effectively theft-proof said trailer.

The chock set as contemplated by the present invention includes a pair of wedges 12 and 14 with their operative angles disposed in vertical planes, each having an operative lower face 16 adapted to lie flat against road surface 8, and an operative upper face 18 inclined relative to face 16, the intersection of said faces defining the apex 20 of the wedge, said apex resting against road surface 8. Each wedge is preferably formed of cast iron or the like and is hollow, being formed in halves permanently affixed together by rivets 22 or the like, as best shown in FIG. 4. The side walls 24 of each wedge are parallel and normally disposed vertically.

Wedges 12 and 14 are disposed in spaced apart relation with their upper operative faces 18 inclined downwardly toward each other, and their lower operative faces 16 disposed in coplanar relation. Said wedges are joined by a connector 26 consisting of a pair of horizontally disposed bars 28 and 30. Bar 28 is provided at one end with a flange 32 affixed against a side wall 24 of wedge 12 by the rivets 22 of said wedge, and extends horizontally toward wedge 14. Bar 30 is provided at one end with a flange 34 affixed to a side wall 24 of wedge 14 by rivets 22 of said wedge, and extends toward wedge 12. Intermediate the wedges, bars 28 and 30 lie in longitudinally overlapping relation, and a loop 36 welded to the extreme end of each bar loosely encircles the adjoining portion of the other bar. Said loops prevent separation of the bars, but permit relative longitudinal sliding thereof, whereby to adjust the spacing between the wedges. Connector 26 is affixed to the corresponding sides of the wedges, so that when said wedges are placed on road surface 8 respectively fore and aft of wheel 2, as shown in FIG. 1, said connector extends alongside the tire 6 of said wheel. Bar 30 has a series of holes 38 formed vertically therethrough, said holes being spaced regularly along the midline of said bar, and bar 28 has at least one hole 40 formed vertically therethrough which, as will appear, registers with one of holes 38 of bar 30.

A toggle lever 42 is pivoted at one end, on a vertical axis, to bar 28 adjacent wedge 12, as by rivet 44, and extends horizontally from said pivot. A generally horizontal toggle link 46 extends above connector 26. One end 48 of said link is bent vertically downwardly and secured pivotally in a hole provided therefore in lever 42 in spaced apart relation from pivot 44. The other end 50 of said link is bent vertically downwardly and engaged selectively and pivotally in one of holes 38 of bar 30 adjacent wedge 14, in a portion of said bar not overlapping bar 28, and secured releasably in said hole by means of a spring retainer pin 52 inserted therethrough beneath said bar. Thus, pivoting lever 42 to the dotted line position of FIG. 2 causes toggle link 46 to extend connector 26 to move the wedges farther apart, as also indicated by the dotted line position of wedge 14. Likewise, pivoting lever 42 to the solid line position of FIG. 2 causes toggle link 46 to retract connector 26 to draw the wedges closer together. As lever 42 approaches this latter position, it traverses a dead-center position in which the axis of said link passes through the upwardly extended axis of pivot 44, and immediately thereafter said lever engages wedge 12, whereby further movement thereof is arrested. In this position of the lever, no amount of separating force exerted on the wedges, short of actual breakage of the parts, can cause the wedges to move farther apart.

In the use of the device, the wedges 12 and 14 are first positioned as shown in FIG. 1, respectively fore and aft of wheel 2, with toggle lever 42 in the dotted line position of FIG. 2, so that the wedges are spaced apart sufficiently far that the insertion of the wedges is rendered easy. Lever 42 is then turned to its solid line position of FIG. 2, whereby the wedges are drawn closer together and driven or wedged tightly between road surface 8 and tire 6, indenting themselves into the yieldable surface of said tire. The vehicle supported by wheel 2 is thus firmly braced against rolling movement either forwardly or rearwardly. The wedges can be adjusted for use with wheels of different diameters, which require different wedge spacings, or for use with wheels the tires of which are inflated to different degrees, this also requiring a different spacing of the wedges, by engaging end 50 of toggle link 46 selectively in various of the holes 38 of bar 30. Also, it should be noted that while bars 28 and 30 of connector 26 are not longitudinally elastic to any appreciable degree, they are formed of sufficiently thin metal as to be resiliently yieldable in torsion, and in transverse flexure. Thus the wedges 12 and 14 can change their relative positions sufficiently to accomodate themselves to a rough, uneven or non-planar road surface 8 to a substantial degree.

When the wedges are contracted as just described to an extent that they indent tire 6 to some degree, they are very difficult to dis-lodge by any means other than operating toggle lever 42 to expand or separate said wedges, short of lifting the vehicle off of the wedges with jacks. Thus, if means are provided for preventing unauthorized operation of lever 42, the wedges act as a theft-proofing, or at least theft-discouraging means for the entire vehicle, presuming that the wedges are sufficiently steep that the vehicle cannot be forcibly driven off of them. An apex angle of about 35° between the operative faces 16 and 18 of the wedges has been found adequate for this purpose. As shown, the locking means includes an ordinary padlock 54, the hasp 56 of which (see FIG. 2) is adapted to be inserted through hole 40 of connector bar 28 and one of holes 38 of connector bar 30. When lever 42 is in the solid line position of FIG. 2, one of holes 38 will always register with hole 40. With the padlock engaged, toggle lever 42 cannot be pivoted and connector 26 cannot be extended. In fact, the connector could not then be extended even if the toggle lever and link were disconnected and removed. The locking means may also include a length of linked chain 58, said chain being looped over axle or axle housing 10 inside of wheel 2, with the end portions thereof being led around the wheel respectively fore and aft thereof, below the horizontal diameter of the wheel, and having its end links brought together and secured in hasp 56 of padlock 54, as shown. Said chain not only renders dislodgment of the wedges from beneath the wheel still more difficult, but also discourages theft of the chocks themselves, since even if the chocks can be dislodged from beneath the wheel, the loop of chain, if properly applied, is too small to be passed upwardly over the wheel.

While I have shown and described a specific embodiment of my invention, it will be readily apparent that many minor changes of structure and operation could be made without departing from the spirit of the invention.

What I claim as new and desire to protect by Letters Patent is:

1. A set of wheel chocks for an automotive vehicle comprising:
   a. a pair of wedges adapted to be rested on the road surface respectively fore and aft of a vehicle wheel with their apeces confronting each other, and
   b. an elongated connector extending between and interconnecting said wedges, said connector being disposed at one lateral side of said wedges whereby to extend alongside said wheel, and comprising a pair of elongated bars slidably telescoped together and having their extended ends affixed respectively to said wedges, a toggle lever pivoted to one of said bars on an axis transverse thereto, and a toggle link pivoted at one end to said lever in spaced relation from the pivot of said lever, and at its opposite end to the other of said bars, at selective points spaced longitudinally therealong, whereby pivotal movement of said lever telescopes said bars to change the spacing between said wedges, the pivots of said toggle lever and said toggle link having an aligned, dead-center relation with said lever pivot intermediate the pivots of said link.

2. The structure as recited in claim 1 wherein said bars are substantially inelastic longitudinally thereof, but are formed of material sufficiently resilient that said connector may yield resiliently in torsion about its longitudinal axis, and in transverse flexure.

3. The structure as recited in claim 1 with the addition of locking means independent of said toggle members and operable to lock said bars positively against telescoping relative movement.

4. The structure as recited in claim 3 wherein said locking means comprises a padlock the hasp of which is operable to be inserted through matching holes formed in said bars in the telescoped portions thereof, and with the addition of a linked chain adapted to be passed over a rigid portion of said vehicle adjacent the inner face of said wheel, its end portions passed respectively fore and aft of said wheel to the outer face of said wheel, and its end links secured in the hasp of said padlock, said connector and said padlock being disposed adjacent the outer face of said wheel.

* * * * *